United States Patent [19]
Rasmussen

[11] Patent Number: 5,350,619
[45] Date of Patent: Sep. 27, 1994

[54] MAT FOR THE COLLECTION OF LIQUID

[75] Inventor: Lars B. Rasmussen, Otterup, Denmark

[73] Assignee: A/S Roulunds Fabriker, Odense S., Denmark

[21] Appl. No.: 949,559

[22] Filed: Nov. 10, 1992

[30] Foreign Application Priority Data

May 14, 1990 [DK] Denmark ............... 1189/90

[51] Int. Cl.$^5$ .......................... B32B 3/28; A47G 9/06
[52] U.S. Cl. ................................. 428/167; 428/58; 428/105; 428/172; 428/294; 428/295; 428/908.8; 5/417
[58] Field of Search .............. 428/156, 105, 172, 113, 428/167, 131, 33, 58, 99, 294, 295, 364, 373, 908.8; 5/417

[56] References Cited

U.S. PATENT DOCUMENTS

| | | | |
|---|---|---|---|
| 3,242,034 | 3/1966 | Trager | 428/167 |
| 3,533,395 | 10/1970 | Yasle | 126/271.1 |
| 4,512,044 | 4/1985 | Clark | 428/167 |

FOREIGN PATENT DOCUMENTS

| | | |
|---|---|---|
| 3818036 | 12/1989 | Fed. Rep. of Germany . |
| 3834537 | 4/1990 | Fed. Rep. of Germany . |
| WO79/00331 | 6/1979 | World Int. Prop. O. . |

Primary Examiner—Donald J. Loney
Attorney, Agent, or Firm—Bacon & Thomas

[57] ABSTRACT

A mat of a liquid-tight, flexible material is provided for the collection of fluid used to treat objects pulled onto the mat. In particular, the mat is used for the collection of deicing fluid during deicing of an aircraft. The mat comprises at least one discharge opening. The mat includes wires for stiffening the mat in the direction of travel on it. The mat may advantageously be formed with grooves for directing the treatment fluid to at least one discharge opening. For use in connection with large mats composed of mutually parallel webs there is provided a fixture for mutual fastening of the webs and sealing of the joint between the webs.

4 Claims, 2 Drawing Sheets

MAT FOR THE COLLECTION OF LIQUID

BACKGROUND OF THE INVENTION

The invention relates to a mat of a liquid-tight, flexible material for the collection of deicing fluid during deicing of an aircraft rolled onto the mat, where the mat comprises at least one discharge opening.

The disclosure of WO 79/00331 and U.S. Pat. No. 3,533,395 deals with systems for deicing aircrafts, which are parked on an area covered with fluid-impermeable concrete or asphalt. The last mentioned system includes a series of dams around the area for trapping the sprayed deicing fluid. According to WO 79/00331 the deicing fluid is drained off through wells and subsurface pipelines, and according to U.S. Pat. No. 3,533,395 through a trench along a part of the perimeter dams.

Said systems suffer from the inconvenience that they cannot be moved to another site, and that an occurring leakage in the concrete or asphaltic covering is very troublesome to repair and that they necessitate a long establishing phase requiring the strip to be closed.

DE 3,834,537 relates to a device of the above mentioned type for use in connection with car washing. The device has the form of a tub with upright detachable or inflatable side walls for salvaging the washwater. Upon driving-in and driving-out the side wall is either removed or it is being run over. Such side walls retaining the fluid are unsuitable when the tub is so large that the operating crew is required to stand on the bottom of the tub when in use, firstly, because a puddle forms on the bottom and, secondly, because the free passage is impeded by the side walls. Moreover, a tub bottom of said material has a tendency to bulge directly downstream of the wheels of a craft rolling in onto the tub bottom. This bulging impedes the free movement of the wheels and it further causes strong, local deformations to occur in the mat material of the tub bottom, resulting in a fast deterioration thereof.

SUMMARY OF THE INVENTION

It is the object of the invention to provide a mat eliminating such bulging from forming and which does not suffer from the above inconveniences.

This is obtained according to the invention with a mat of the above mentioned type that is characterized in that it further comprises steel wires embedded in the mat material and extending in the direction of travel on the mat for stiffening the mat in said direction, and grooves extending transversely to the direction of travel to permit the deicing fluid to flow to the discharge opening.

A mat manufactured in this manner is stiff in the direction of travel but is flexible in the direction perpendicular to the direction of travel, and it may be rolled with the view of conveyance from one site to another. In view of the fact that the steel wires are embedded in the mat material they are not subjected to any corroding impact from the deicing fluid or from any general decomposition process caused by weather conditions. It has further been found that extending the grooves transversely to the direction of travel of the aircraft on the mat ensures that the fluid on the mat is not blown away by the stream of air from the engines of the aircrafts.

In a further embodiment some of the grooves discharge at the edges of the mat, and the outlets of the grooves constitute the discharge openings. In these embodiments the fluid runs through the grooves to a discharge opening that may be connected with a collecting well in the subjacent layer or, when the grooves are extended to the edges of the mat, the fluid may drain into a digged, prefabricated or cast trench extending along the circumference of the mat. Collected fluid may run from this trench to a plant in which it is pumped up and purified for reuse.

A further preferred embodiment of the mat according to the invention is characterized in that it is composed of mutually parallel webs extending transversely to the direction of travel, and that the webs are provided with engagement means along the edges for engagement with fixtures adapted to, on one hand, affixing the webs to each other and to the subjacent layer on which the mat is placed and, on the other hand, to seal the joints between the webs. It is thus made possible to construct the very large mats that are necessary when aircrafts are deiced.

On its surface the mat may between the grooves have upright friction promoting members between which the deicing fluid may drain to the grooves. This offers a safe footing on the mat to the vehicles as well as to the staff, even when using greasy deicing fluids.

The invention will now be explained in detail by means of an example with reference to the drawings, in which

DESCRIPTION OF THE PREFERRED EMBODIMENTS

Figure 1:
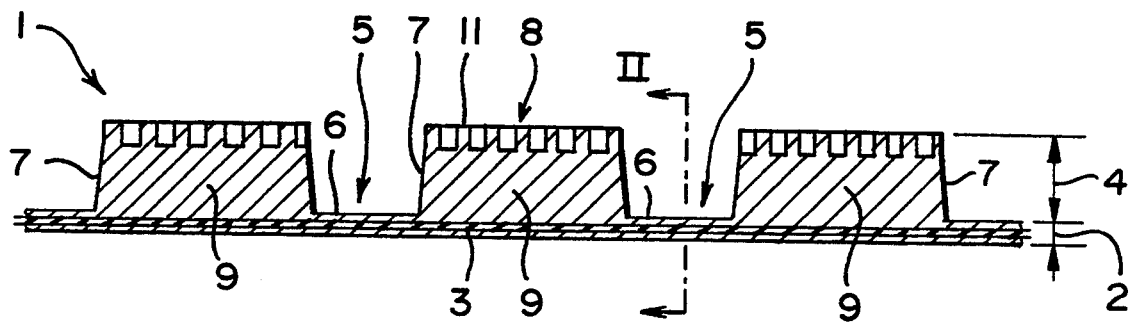
FIG. 1 is a sectional view along the stiffeners of a mat, according to the invention, with grooves.
Figure 2:
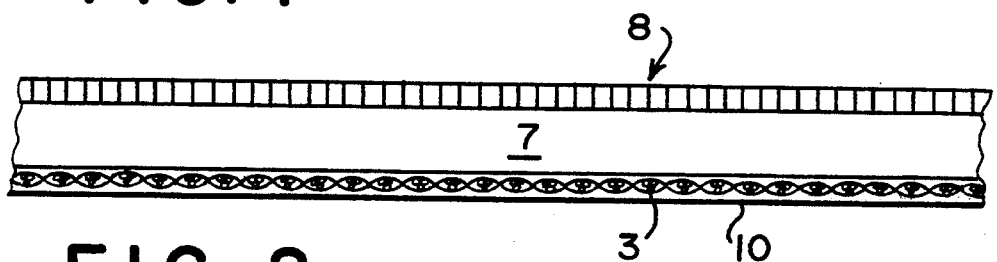
FIG. 2 is a section along the line II—II of the mat in FIG. 1.

The mat 1 illustrated in FIGS. 1 and 2 is made from vulcanized rubber and includes a bottom section 2 with embedded stiffeners in the form of a large number of parallel steelwires 3 twisted together in sets of three wires, and a top section 4 containing rectilinear grooves 5 extending perpendicular to the stiffeners and thus to the direction of travel on the mat. Grooves 5 have by and large a plane bottom 6, and the groove sides 7 are sloping a little from each other so that the groove opens a little towards the upper side 8 of the mat. The area of the cross section 9 of the material between two adjacent grooves 5 is about twice the cross-sectional area of a single groove. The parts 9 located between the grooves of the top section 4 of the mat are thus capable of sustaining the concentrated load originating from a wheel of a vehicle without exerting any excessive stress on the material edges at the grooves.

FIG. 2 illustrates that the twisted wires are woven with a layer of perpendicularly extending yarns 10 acting in this case as a strengthening or reinforcement of the rubber material of the mat. It would, however, also be possible to make use of an independent reinforcement, e.g. consisting of an embedded canvas fabric.

Figure 3:
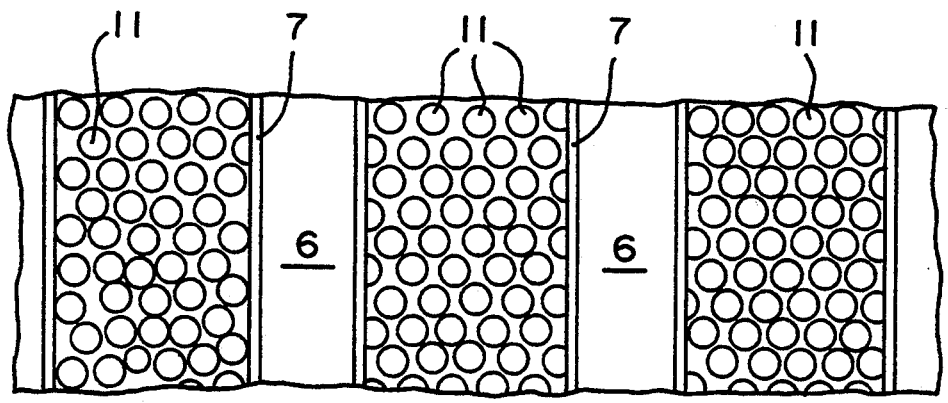
FIG. 3 is a sectional view of the mat in FIG. 1, viewed from above.

As it appears from FIGS. 1 to 3 the upper side of the mat is designed with a pattern consisting of a large number of closely spaced, upright bodies 11. This design ensures that the mat is non-slip, even when using greasy or lubricating treatment fluids, the fluid being capable of flowing between bodies 11 to grooves 5, thereby preventing large coherent fluid surfaces from forming on the mat surface.

Figure 4:
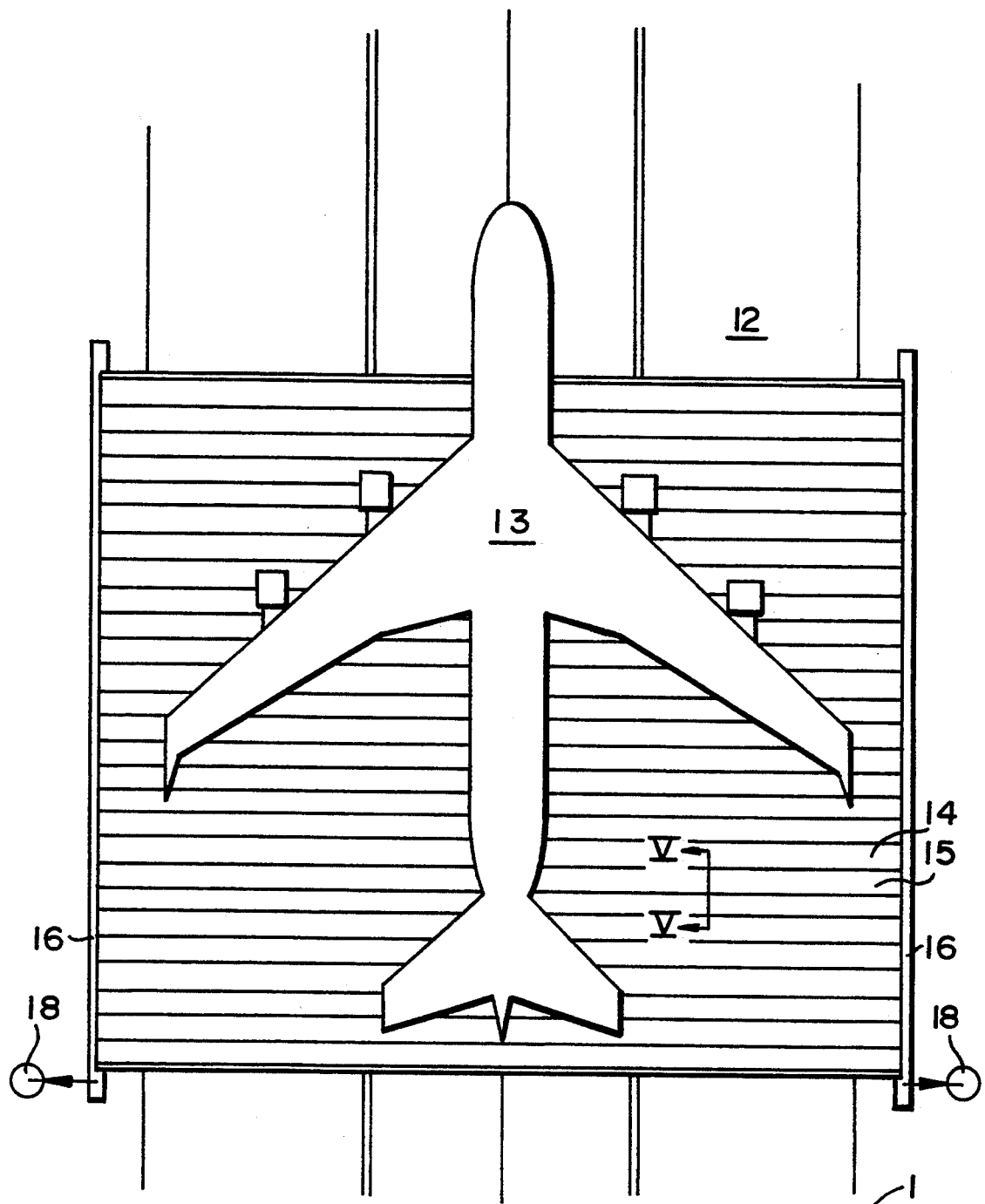
FIG. 4 is a plane view of a mat consisting of several webs of mat joined together and secured by fixtures.
Figure 6:
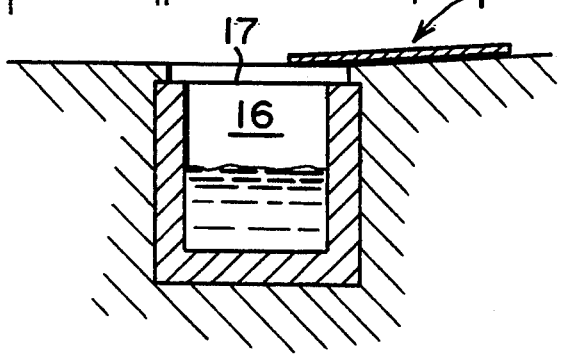
FIG. 6 is a sectional view of a trench along the edge of the mat in FIG. 4.

FIG. 4 illustrates a mat composed of a large number of parallel webs that are laid out transversely to the travelling direction on the mat. The mat is laid on a taxi strip 12 for an aircraft 13 to be sprayed with deicing fluid. The webs, e.g. 14 and 15, have longitudinal grooves 5 and along the two sides of the mat formed by the ends of the webs a cement-cast collecting trench 16 is provided which is covered by a grating 17. At one end of each collecting trench 16 there is marked a well 18 from which collected treatment fluid by means of a pumping assembly, not shown, may be pumped up to a purification plant with a view to reuse. The collecting trenches 16 and wells 18 must be dimensioned so as to be capable of receiving and discharging the actually comparatively large quantities of water that might turn up due to heavy showers.

Figure 5:
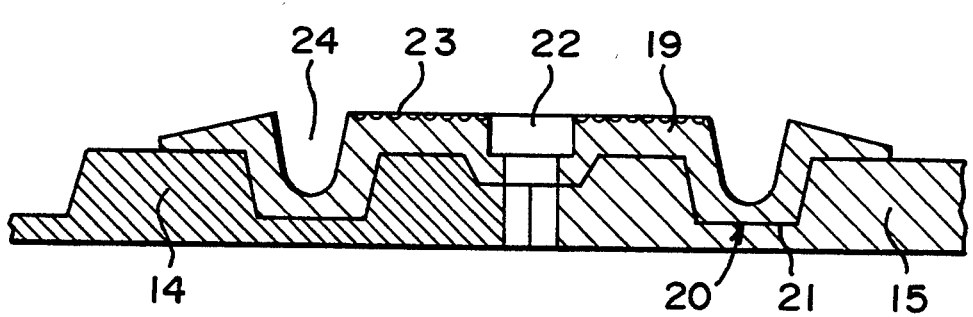
FIG. 5 is a sectional view along the line V—V in FIG. 4, illustrating on a larger scale two adjacent mat webs assembled and secured by means of a fixture.

FIG. 5 illustrates how two adjacent webs of mat 14, 15 may be affixed to each other and to the subjacent layer 12 by means of a fixture 19. Fixture 19 is on its underside provided with protruding sections 20 tightly fitting into corresponding grooves 21 in the surfaces of the mat webs along the longitudinal sides of the webs. Grooves 21 have the same cross-sectional shape as grooves 5 but may alternatively be designed as a dovetailed spline, if desired; the protruding sections must then have a corresponding shape. Fixture 19 is affixed to the subjacent layer by means of bolts, not shown, passed through appropriate clearance holes 22 located in the longitudinal centre line of the fixture across the adjacent edges of mat webs 14 and 15. The upper side of the fixture is provided with raised pattern 23 ensuring that it is non-slip. On the upper side above sections 20 the fixture has grooves 24 for the drainage of treatment fluid. The longitudinal edges of the fixture are sloping in order to present the least possible resistance against rolling on the mat.

Fixture 19 does not need to extend throughout the length of the web but in dependence on the weight of the mat, the nature and the type of the treatment to be effected, it may be a composite of short rail sections uniformly spaced apart.

In order that the mat is able to effect drainage of the treatment fluid it is required that the adjacent layer is sloping in the direction of the grooves. This is generally the case when unfolding the mat on flight taxi strips, the taxi strip having a certain inclination in order to drain off rainwater. The arrangement of a mat on such a taxi strip merely necessitates the mat webs being unrolled and fastened to each other and to the subjacent layer by means of fixtures 19 as described. Trenches 16, e.g. with associated gratings 17, are provided along the circumference to the mat from which the treatment fluid is discharged.

FIG. 4 illustrates a cement-cast collection trench 16 but in case of a smaller mat made in one piece, it may be sufficient along the circumference of the mat to provide a trench which at a single point is for instance extended to the edge of the mat where a discharge well may be arranged.

What is claimed is:

1. A mat for collecting deicing fluid during deicing of an aircraft rolled in a predetermined longitudinal direction of travel onto the mat comprising:
   a bottom section made from a liquid-tight, flexible material, said bottom section including a pair of longitudinally extending edges that are spaced in a transverse direction of said mat;
   an upper section made from a liquid-tight, flexible material, said upper section being formed with a plurality of grooves for drainage of deicing fluid, said grooves being longitudinally spaced and extending transversely across said mat, at least some of said grooves defining discharge outlets that open at said longitudinally extending edges; and
   means for stiffening and preventing the mat from bulging, said means for stiffening and preventing bulging including a plurality of longitudinally extending, transversely spaced and substantially parallel steel wires embedded in said bottom section.

2. A mat according to claim 1, comprising mutually parallel and transversely extending webs, wherein said webs are provided with engagement means along said longitudinally extending edges for engagement with fixtures adapted to affix the webs to each other and to a subadjacent layer on which the mat is placed and to seal the joints between the webs.

3. A mat according to claim 1, wherein the mat surface between the grooves has upright, friction promoting members between which the deicing fluid may drain to the grooves.

4. A mat according to claim 2, wherein the mat surface between the grooves has upright, friction promoting members between which the deicing fluid may drain to the grooves.

* * * * *